US006491258B1

(12) United States Patent
Boyd et al.

(10) Patent No.: US 6,491,258 B1
(45) Date of Patent: Dec. 10, 2002

(54) SPACE ELEVATOR

(75) Inventors: Robert Raymond Boyd, Arlington, VA (US); Dimitri David Thomas, Mountain View, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/730,474

(22) Filed: Dec. 6, 2000

Related U.S. Application Data (63) Continuation-in-part of application No. 09/285,736, filed on Apr. 5, 1999, now abandoned.

(51) Int. Cl.[7] .............................................. B64G 1/00
(52) U.S. Cl. .................... 244/158; 244/158 R; 244/161
(58) Field of Search ........................... 244/158 R, 158, 244/161

(56) References Cited

U.S. PATENT DOCUMENTS

| 5,306,879 | A | * | 4/1994 | Pearson ...................... 187/131 |
| 6,035,974 | A | * | 3/2000 | Richter et al. .............. 187/404 |
| 6,173,922 | B1 | * | 1/2001 | Hoyt et al. .................. 244/172 |
| 6,260,807 | B1 | * | 7/2001 | Hoyt et al. .................. 244/172 |
| 6,286,788 | B1 | * | 9/2001 | Hoyt et al. .................. 244/172 |
| 6,290,186 | B1 | * | 9/2001 | Hoyt et al. .................. 244/172 |

OTHER PUBLICATIONS

Hypersonic Airplnae Space Tether Orbital Launch System: Initial Study Results; Dr. Robert L. Forward,Oct. 1999; pp1–12.*

"Failsafe Multistrand Tether Structures for Space Propulsion", Dr. Forward, Jul. 1992; pp. 1–15.*

"Tether Transport From LEO to the Lunar Surface", Dr. Forward, Apr. 1991; pp. 1–5.*

"Tether Applications develops space tethers amoung other things, for research, and other scientific purposes", Carroll, Aug. 1999,pp. 1–6.*

"Space Elevators An Advanced Earth–Space Infrastructure for the New Millennium"; D.V. Smitherman, Jr. Aug. 2000, pp. 10–12.*

"Space Elevators, Space Hotels, and Space Tourism", Willson, Aug. 1998; pp. 1–20.*

* cited by examiner

Primary Examiner—Charles T. Jordan
Assistant Examiner—Stephen A Holzen
(74) Attorney, Agent, or Firm—Lockheed Martin Corporation (57) ABSTRACT

A Space Elevator for transporting a payload from one point to another in outer space, includes a first structure, located at a first relatively fixed, non-zero orbital distance from the surface of the earth, for receiving payloads, a second structure, located at a second relatively fixed orbital distance from the surface of the earth, for receiving payloads, where the second distance is greater than the first distance, a third structure located near the center of gravity of the combined apparatus providing a platform for storing and/or processing payloads, and a payload transporting apparatus disposed between and interconnecting the first and third and second and third structural means.

10 Claims, 4 Drawing Sheets

**ELEVATOR ORBIT PERTURBATION
DUE TO PAYLOAD ADDITION**

*FIG. 4*

ELEVATOR PERTURBATION PROFILE

*FIG. 5*

SPACE ELEVATOR

CROSS REFERENCE TO RELATED APPLICATIONS

This application is a continuation-in-part of U.S. patent application Ser. No. 09/285,736, filed Apr. 5, 1999 now ABN to Boyd et al.

BACKGROUND OF THE INVENTION

1. Field of the Invention

The present invention relates generally to payload transporting, and more particularly to a process and apparatus for moving materials and personnel from the surface of the earth into space or from one location in space to another location.

2. Description of Related Art

The conquest of space has always been severely limited by the inability to move materials and personnel (payload) from the surface of the earth to space. At first, this limitation was substantially technical, but with the development of chemical rockets and improved guidance systems, technical issues have ceased to be the primary driver. Instead, the primary limitation today is the cost (often measured in dollars per pound) of moving payload from the surface of the earth to orbit, to the moon, or to other planets. Currently, the most modern launch systems achieve launch costs no better than $4,000–$10,000 per pound for moving payloads from the ground to low earth orbit.

Currently, chemical rockets employing liquid and/or solid fuels are the primary methods used for placing objects in orbit and transferring objects from one orbit to another. To achieve orbit, massive quantities of propellant (oxidizer and fuel) are required. For example, for the space Shuttle, 3.8 million pounds of propellant are required. The propellant must be carried with the vehicle as well as the payload as it travels to orbit. The fraction of the total vehicle weight that must be allocated to propellant for the rocket is a function of the required velocity change ($\Delta V$) and the engine specific impulse ($I_{sp}$), and is determined by the following equation:

$$\frac{M_{Propellant}}{M_{GLOW}} = 1 - \text{EXP}\left[\frac{-\Delta V}{g \cdot I_{SP}}\right]$$

The engine $I_{sp}$ is a measure of engine performance and currently is on the order of 455 seconds for high performance chemical rockets. To go from earth to the lowest stable orbit requires a $\Delta V$ change (energy input) of 32,000 ft/s and thus a vehicle exceeding 90% propellant is required.

Achieving such a large propellant fraction is not easy, and meeting this requirement drives the size of the vehicle. If the $\Delta V$ requirements (energy required) can be reduced, the size of the vehicle and the amount of propellant required by the vehicle can be reduced. This, in turn, will reduce the cost of placing payloads into orbit.

The problem is further exacerbated by the requirement to move payloads from the lowest stable orbit to higher orbits in the same or different planes. Payloads left in the lowest stable earth orbits are not useful, so some additional energy is always expended; the exact amount varies from launch to launch. To transfer a payload from one orbit to another requires an additional $\Delta V$ change above the initial launch energy, approximately 13,000 ft/sec to transfer from low earth orbit to geosynchronous orbit (a common destination). To achieve such an orbit transfer, the transfer vehicle, also known as an "upper stage", must be approximately 59% propellant (by mass). While a 59% propellant fraction is much easier to achieve for the upper stage alone, propellant is still consumed. Also adding to cost, the upper stage vehicle is typically not reusable. The major cost driver comes from the fact that the upper stage transfer device has already been lifted to low earth orbit as a "payload" on the main stage, and the fractions are thus multiplicative, making the original vehicle on the ground less than 1% useful payload.

While improvements to rocket performance (Isp and thrust-to-weight) increase the useful payload fraction a small amount, and increased reusability and ground handling can reduce costs substantially, the cost of moving payload to low earth orbit using chemical rockets will likely, in the foreseeable future, not fall below $1000/lb. To further reduce launch costs, a substantially different system will be required. It will be necessary to take advantage of natural orbital physics to reduce the required energy to move payloads into orbit. By reducing the energy required, and therefore the fuel fraction, the useful payload can be increased, resulting in a substantial reduction in overall launch costs.

Historically, many methods for adding or subtracting $\Delta V$ from orbiting payloads have been conceived. One class of such methods pursuant to the present invention consists of entities utilizing the "tether", or long single strand of material connecting two points in orbit. Tethers have typically been classified as propulsive, de-orbit, spinning or lifting.

Propulsive tethers can be used in low earth orbits in conjunction with the earth's magnetic field to produce thrust (i.e., adding $\Delta V$). Electrical current is run through a conducting wire oriented vertically to the Earth's surface, producing an electromagnetic field around the tether. The interaction of the tether's electromagnetic field and the earth's magnetic field results in an electrodynamic force parallel to the direction of travel that can be used to propel the tether and its host vehicle. Pursuant to the current invention, many variants of propulsive tethers remain strong candidates as primary re-boost engines for the Space Elevator.

De-orbit tethers can also be used in low earth orbits in conjunction with the earth's magnetic field. The de-orbit tether has current induced into a conducting wire (oriented vertically relative to the earth's surface) from the earth's magnetic field. The current produces power, which is converted into heat through the resistance of the tether's conducting material or some resistance means connected to the circuit. The heat dissipation extracts kinetic energy from the system, thereby reducing $\Delta V$. In the present invention, the re-boost electrodynamic tethers could be reconfigured to function as a de-orbit tether if required to slow the Space Elevator.

Spinning tethers add or subtract $\Delta V$ by actively changing the angular velocity of the payload. The payload is attached to the launcher motor by the tether. The motor increases or decreases the angular velocity of the payload and then releases the payload. The present invention does not employ spinning tether motion or attributes, though spinning tethers represent a potential competitive system.

Lifting tethers add or subtract $\Delta V$ by transporting the payload to higher or lower orbits while maintaining the angular momentum of the lifting tether system. The payload is translated along the tether to the desired orbit and then released. The structure of the tether is typically a single strand of material oriented vertically to the surface of the planet orbited. Many such designs, including several which are anchored to planetary surfaces are noted in the references. The earth-orbiting tether disclosed in October 1994 in SAE Technical Paper Series #942120 (Aerotech '94, Los Angeles, Calif.) represents the state of the art for lifting tether designs. It consists of an elevator, two crew-inhabitable, variable-location, endpoint stations, and a crew-inhabitable, variable location, midpoint station. The location of the earth orbiting tether's center of mass is controlled by moving the elevators, the endpoint stations, and the midpoint station, and by use of an on-board ion propulsion system. The present invention would be classified in the "lifting" tether category and represents a substantial improvement in the state of the art for movement of payloads in space, as outlined in the detailed description.

Against this background of known technology, the inventor has devised a permanent orbiting upper stage, or Space Elevator, which will allow payload transfer from space vehicles in sub-earth orbits to space vehicles in higher orbits using a substantially smaller amount of energy while also minimizing cost of operation.

OBJECTIVES AND SUMMARY OF THE INVENTION

It is therefore an objective of the present invention to provide a novel method and apparatus for moving payload from sub-earth orbits to higher altitude orbits using substantially less energy than has been required in the past, while overcoming many of the disadvantages and drawbacks of similar previously known techniques and apparatus.

Yet another objective of the present invention is to provide for the transport of material and personnel from the surface of the earth into orbit while reducing energy and the amount of propellant required for launch, thereby achieving substantially reduced costs to move such payloads into orbit.

Yet another objective of the present invention is to provide a novel method and apparatus for moving payload from sub-earth orbits to higher altitude orbits that is not attached to the earth's surface.

DETAILED DESCRIPTION OF THE INVENTION

The following description is provided to enable any person skilled in the art to make and use the invention, and sets forth the best modes contemplated by the inventor of carrying out his invention.

Variations, however, may be readily apparent to those skilled in the art, since only the generic principles of the present invention have been defined herein specifically to provide teachings for an "elevator" apparatus useful in transporting material and personnel from the earth's surface into orbit.

Figure 1:
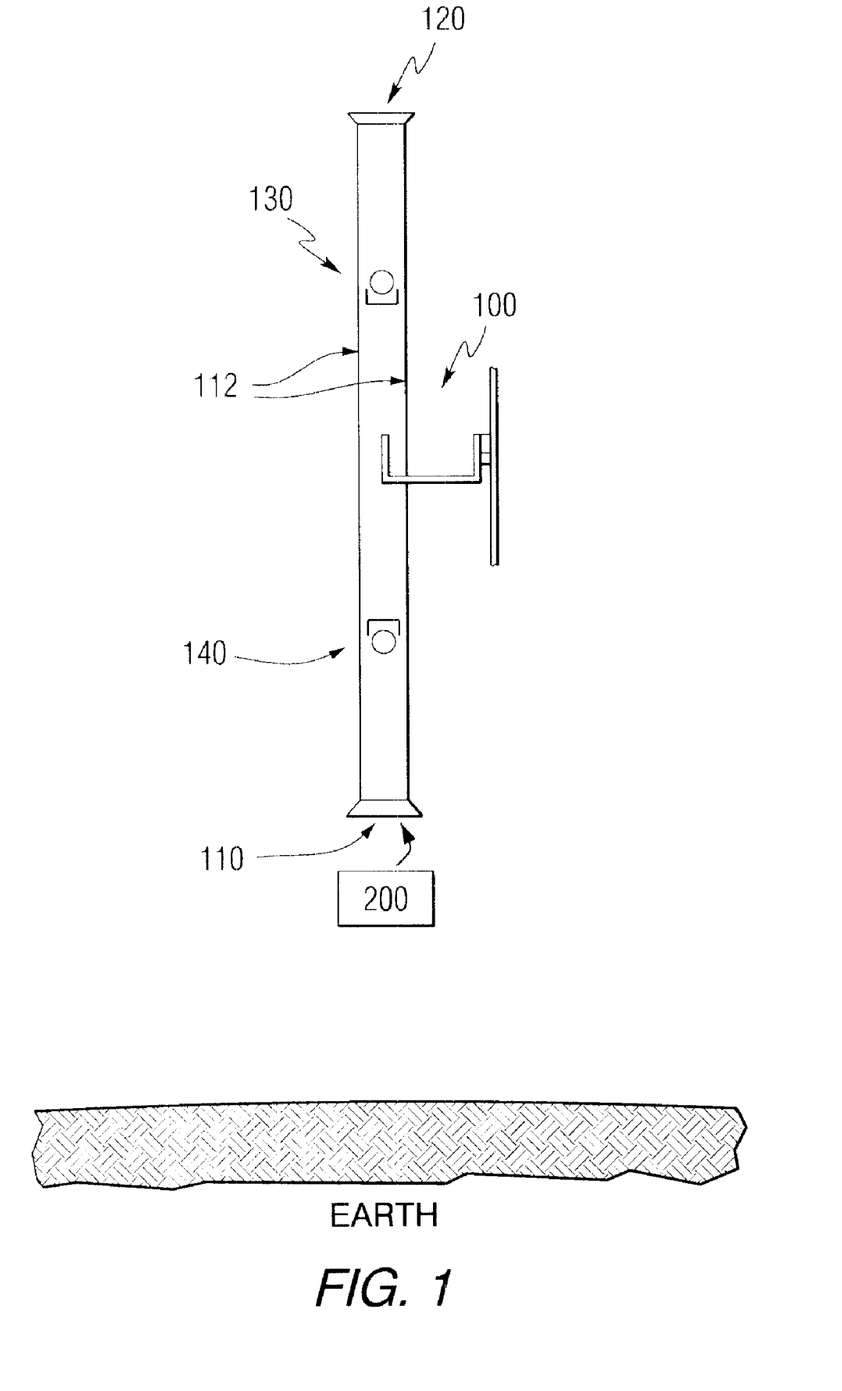
FIG. 1 is a schematic diagram showing the concept of the present invention.

Referring now to FIG. 1, the Space Elevator of the present invention includes a "centrally" located zero-g Apex Station 100, a lower altitude Earth Transfer Station (ETS) 110, a higher altitude Space Transfer Station (STS) 120, an upper elevator 130 and a lower elevator 140. Cables 112 connect the Apex Station 100 and the Earth Transfer Station and Space transfer Station endpoint stations 110, 120 to each other. The upper and lower elevator carriages 130, 140 move between the end point stations and the Apex Station via the cables 112. No portion of the Space Elevator is attached to the Earth's surface. Space bound payloads are delivered to the Earth Transfer Station 110 by a Sub-Orbital Launch Vehicle (SOLV) 200, launched from the earth's surface. At the Earth Transfer Station 110, the payloads are transferred from the SOLV 200 to an elevator carriage. The elevator carriage then engages a friction drive motor to transport the payload along the cable of the Space Elevator to either the Apex Station or Space Transfer Station. At either station, the payload is released into free space, and small positioning engines aboard the payload deliver the payload to its final destination, typically a Low Earth Orbit (LEO) representative of space station operations or low altitude satellites, a Middle Earth Orbit (MEO) consisting of wider range satellites and potential future station activity, Geosynchronous Orbit (GEO) (approximately 22,500 miles from earth in an equatorial plane) populated largely by communications satellites, or Beyond Earth Orbit (BEO) to a remote destination such as the moon, Mars, or beyond. Earth-bound payloads follow a similar procedure in reverse. They are delivered to the Apex Station or the Space Transfer Station and moved to the Earth Transfer Station via the elevator carriages. The payloads are then retrieved by an SOLV 200 or jettisoned (as waste material) and allowed to burn up during re-entry.

The Space Elevator of the present invention will first be located in low earth orbit, and later, a larger-scale elevator system will be located in medium earth orbit. The low earth orbit located invention (LEO Elevator) will move payloads from low stable circular orbits to higher orbits typical of communications satellites and the International Space Station and serve as a technology demonstrator for the larger system. The medium earth orbit located invention (BEO Elevator) will move payloads from a sub-orbital transfer point (the ETS) to medium, high, and beyond earth orbits (MEO, HEO, and BEO, respectively) typical of communications satellites, and interplanetary probes. For the low earth orbit embodiment, the Earth Transfer Station, the Space Transfer Station, and the Apex Station will preferably be located at altitudes of 80–100 nautical miles (nmi), 100–120 nmi, and 250–270 nmi, respectively. It is contemplated that the total weight of the low earth orbit elevator will be about 275,000 lb.

Pursuant to the teachings of the present invention, the smaller scale, low earth orbit, Space Elevator will provide data concerning: (1) launch and deployment of the Space Elevator system, (2) operational system performance and servicing, (3) Space Elevator system dynamics when transferring and transporting payloads, (4) Payload transfer between the Sub-orbital Launch Vehicle or the Orbital Transfer Vehicle and the endpoint station or elevator; (5) power transfer from the Apex Station to the elevator via a conducting load cable or other suitable power transfer mechanism, (6) cable micrometeorite impact resistance, and (7) power generation and distribution. Following completion of these tasks, the Low Earth Orbit Elevator will continue to operate, transferring payloads from low earth orbit to Space Station or other Earth Orbits. The larger scale elevator would be a lower inclination "Beyond Earth Orbit" (BEO) elevator. The Earth Transfer Station, Space Transfer Station, and Apex Station for the BEO elevator are expected to be located at an altitude of 80–230 nmi, 800–950 nmi, and 1825–1975 nmi, respectively. The total weight of the BEO elevator, assuming endpoint soft docking with the Sub-orbital Launch Vehicle or the Orbital Transfer Vehicle, would be about 1,225,000 lb. The BEO elevator will be used to deliver and return payloads from low earth, medium earth and beyond earth orbits. The length of the BEO Elevator (approximately 3000 km as shown in FIG. 1) has been selected specifically to link escape velocity at the upper end and stay physically above the atmosphere at the lower end while minimizing overall system mass. This selected length is substantially shorter than ground to GEO tether system proposals; short enough to actually be constructed from current materials. Ground-attached systems are far too long to be physically possible. A key advantage to the Space Elevator of the present invention is the ability of the system to be constructed from physically available materials.

Physics of the System

Forces similar to other orbiting space vehicles influence motion of the Space Elevator. The principle force, gravitational attraction of the earth, is opposed by the "centripetal" force arising from the velocity of the Space Elevator around the planet. These forces are conservative, which means they are reversible and the principles of conservation of energy and momentum apply. Non-conservative forces such as applied thrust, aerodynamic drag, solar wind drag, flatness perturbation, etc. are small and can be handled as perturbations to the stable conservative orbits. This represents standard practice for current spacecraft orbiting the planet. Orbital parameters are determined by the motion of the vehicle center of mass (CM); velocity and location of the CM above the earth's surface at apogee and perigee define the trajectory around the earth. All components rigidly attached to the CM can be assumed to carry these same orbital parameters. The Space Elevator, however, has a substantial length in the vertical direction, which causes some effects that run counter to our typical view of orbital dynamics.

As developed in several of the references, most notably the "Tether Handbook", the vertical extent of a tether system such as the Space Elevator creates some effects which go unobserved in standard spacecraft. For example, the angular velocity (w) of all points on the Space Elevator is the same since the Space Elevator always remains in a vertical orientation relative to the earth. From this fact, the equations for the velocity at any given point can be developed (below).

$$V_{cg} = \sqrt{\frac{\mu_e}{r_{cg}}} \qquad V = r \cdot \omega$$

$$\omega = \omega_{cg} = \frac{V_{cg}}{r_{cg}} = \sqrt{\frac{\mu_e}{r_{cg}^3}} \qquad V_{edge} = r_{edge} \cdot \sqrt{\frac{\mu_e}{r_{cg}^3}}$$

Where:
 $V_{cg}$ is the circular orbit velocity of the center of gravity of the satellite.
 $r_{cg}$ is the distance from the center of the Earth to the center of gravity of the satellite
 $\mu_e$ is the Earth gravitational constant (equals the universal gravitational constant time the mass of the Earth)

$\omega$ is the angular velocity (Constant for all points of an orbiting satellite)
 $\omega_{cg}$ is the angular velocity at the center of gravity of the satellite=angular velocity of any point on the satellite
 $r_{edge}$ is the distance from the center of the earth to edge of the satellite
 $V_{edge}$ is the velocity at the edge of the satellite Due to the existence of this velocity variation, a gravity gradient is observed along the length of the cable system. The gravity gradient arises from the imbalance of gravitational force and centripetal force along the vertical extent of the system. This gravity gradient causes a net force that pulls objects away from the center of mass; downward below the CM and upward above the CM; an effect governed by the equations below.

$$a = a_g - a_c = \frac{\mu_e}{r^2} - r \cdot \frac{\mu_e}{r_{cm}^3}$$

Where:
 a is the net acceleration of the orbiting system
 $a_g$ is the acceleration due to gravity $a_g = \mu_e/r^2$
 $a_c$ is the centripetal acceleration: $a_c = r(\mu_e/r_{em}^3)$
 $r_{eg}$ is the distance from the Earth to the center of gravity of the orbiting system
 r is the distance from the center of the Earth to a given point on the satellite Thus our common conception that space is "zero gravity" fails in the case of a Space Elevator. Additionally, since the angular velocity is constant at all points along the Space Elevator, the linear velocity increases with altitude. At the lower extent of the Space Elevator, the velocity is much lower than orbital speed at that altitude. If the Earth Transfer Station were not rigidly attached to the Apex Station through the cables it would immediately de-orbit and burn up in the atmosphere. At the upper end of the Space Elevator, the velocity is much faster than would be required for circular orbit at that altitude, thus the Space Transfer Station would fly into outer space if it were not rigidly attached. The effects of these velocity shifts are very important to the overall efficiency of the system, since lower velocity at the bottom improves the performance of the vehicle coming up from the earth and the higher velocity allows payloads to easily achieve escape speed. Movement of payloads onto, off of, and along the Space Elevator causes effects that also run counter to intuition and are the subject of the next section. All of the physical effects of the long vertical extent of the Space Elevator are well documented in the references but the advantages gained from the Space Elevator are unique to the present invention.

The physical reaction to the movement of payload onto, off of, or along the Space Elevator can be described by the change in orbital parameters and the resulting re-boosting requirements. Once any object has achieved a stable orbit in a conservative field like earth's gravity, the conservation of angular momentum law states that no energy input is required to continue in that orbit. Therefore once in orbit, boosting rockets are not required (except for small control forces) unless a payload is added to the system at either end of the Space Elevator. If mass is added or subtracted from any object, including the Space Elevator, at anything other than the same angular momentum, the orbit will be altered in shape. Once the new orbit has been determined, which happens instantaneously, the object (or objects if mass is removed) will continue in that new orbit without energy input.

Non-conservative forces such as rocket thrust or atmospheric drag will alter the orbit of the object(s) if applied to the rigid structure in any direction. Applying thrust (or changing the energy) of the object will alter the orbit, typically with the objective of establishing a new orbit that meets some goal criteria such as the original altitude and speed. Atmospheric drag will act on all objects in orbit but the magnitude of such forces is very small at altitudes above the useful atmosphere (typically 60 km). The small atmospheric drag force does, however, act to de-orbit all satellites over time, though typically it takes years to cause full de-orbit. Small amounts of rocket thrust are typically applied to counter these forces and other small perturbations due to the solar wind, earth flatness (not a perfect sphere), debris impacts, or other orbit altering forces. For all stable orbits around the earth, the forces of angular momentum and gravity are many orders of magnitude larger than any other forces present.

In the case of the Space Elevator, the elevator as a whole always tracks an orbital path with respect to the center of mass of the elevator system, the "system" being defined by all mass rigidly attached to the elevator. With no payload attached, the Space Elevator is constructed such that a given physical point, say the center of the Apex Station, defines the center of mass. In this case, the Apex Station center defines the orbital path. The upper and lower ends of the Space Elevator (Space Transfer Station and Earth Transfer Station) are located by the length of cable extending from the Apex Station. The cables always remain taut and vertical due to the natural forces of gravity and centripetal acceleration, which pull the cables outward from the center. Therefore the Space Transfer Station and Earth Transfer Station are not fixed at a location in space, but are fixed at a predetermined distance from the Apex Station (which defines the orbital path).

According to the laws of physics, the Space Elevator can be defined as a rigid body with a calculatable center of mass (CM), with its' orbital path wholly defined by the motion of this center of mass. In the case of a circular orbit, the velocity and radius from the Earth's center to the CM are all that is required to calculate the major parameters of the orbit. In the case of an elliptical orbit, one needs to know the apogee and perigee conditions. It is interesting to note that the mass of the Space Elevator has no effect on the steady state orbit of the system; a fact that will become important in perturbing cases.

Perturbation of the steady state orbit can be accomplished by two means: applying an external force (not gravity or centripetal), or adding or deleting mass with momentum different from the momentum of the CM. The first case, applying force, has been discussed and will be employed principally in Space Elevator operations to adjust the elevator orbit back to the original steady state.

Figure 4:
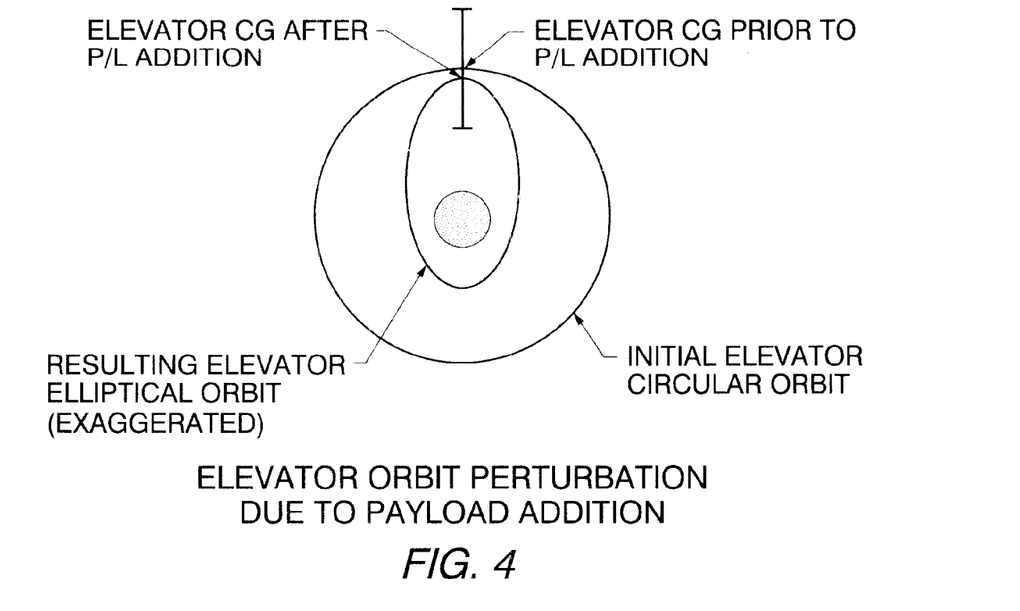
FIG. 4 illustrates the effect on the orbit of the Space Elevator of the present invention with the addition of a payload.

The second case, momentum change, is critical to the operation of the Space Elevator, since addition or subtraction of mass to the Space Elevator is the system's primary function. If mass is added that matches the momentum of the Space Elevator, the orbit remains unchanged. This case defines virtually all the rendezvous operations employed in typical space operations to date. When the shuttle docks with a satellite, it must match the position and speed of the satellite. Since both objects are small in vertical extent as compared to the radius of the orbit from the Earth's center, the velocity of the upper and lower portions of these objects is virtually the same. As a matter of detail, they are not precisely the same, but the difference is a few thousandths of a percent. By matching speed and position, the shuttle is matching angular momentum. Therefore when the docking occurs, neither object experiences a change in orbital path. If one docked with the Space Elevator at the CM (e.g. Apex Station), the orbit of the Space Elevator would not change. The more typical case involves docking at the lower or upper end of the Space Elevator, where useful work can be imparted to a payload. The Space Elevator is long enough to see a substantial change in local linear velocity along its length, lower velocity at the bottom and higher velocity at the top. The local gravity that arises from this situation would cause both ends to fly away from the center if they were not rigidly attached to the center by means of the cable assembly. If payload mass is added at the lower end of the station, the angular momentum of the payload is less than the Space Elevator CM, thus the resulting state has lower net energy. Lower energy means a de-orbit occurs, where the Space Elevator drops into an elliptical orbit inscribed into its' original circular one (FIG. 4). The severity of this ellipticity is proportional to the difference in momenta and difference in mass of the two objects. For the Space Elevator in operation, the payload mass will represent less than 4% of the Space Elevator mass, thus the ellipticity will be small. For the same reason, the movement of the CM from the original point (i.e. Apex Station center) will be small (less than 1% of the elevator length). This is important as the orbit of the whole system tracks with the CM, so excessive shift or eccentricity could cause the lower end to dip into the thicker atmosphere and drag the system toward earth.

It is important to understand how the momentum of the Space Elevator keeps the system "up" in a stable orbit. Consider it this way, in non-rotating or slowly rotating frames of reference, such as if our cables were attached to a building on earth, we would expect to see a net "pull" downward on the cables reflecting the added payload; and thus require a "restoring force" from the building to keep them stationary. In rotating frames, such as in space, the "restoring force" is the centripetal force caused by the orbital motion of the Space Elevator. Of course, the centripetal "force" is not really a physical force, but an apparent one due to the acceleration of the object around the center of rotation (in our case, the earth). The magnitude of the centripetal force available for the Space Elevator is very large, being proportional to the mass of the Space Elevator and the square of its' velocity. Thus the Space Elevator remains in orbit with the addition of payload, which represents a small fraction of the total Space Elevator mass, allowing time to apply thrust and restore the Space elevator to its' original condition while carrying the payload.

The orbital motion and the shift in the center of mass (center of gravity) of the Space Elevator can be described by known physical representations.

By applying conservation of angular momentum, the apogee velocity after payload transfer is given by:

$$V_{ES} = \sqrt{\frac{\mu_e}{R_{AS}^3}} \cdot \frac{M_E \cdot R_{AS} + M_{P/L} \cdot R_{ETS}}{M_E + M_{P/L}}$$

Where:
  $V_{ES}$ is the velocity of the elevator system (elevator plus payload) after payload addition
  $M_E$ is the mass of the elevator
  $M_{P/L}$ is the mass of the payload
  $R_{AS}$ is the radius of the apex station from the center of the Earth
  $R_{ETS}$ is the radius of the Earth transfer station from the center of the Earth The new center of gravity is determined by:

$$R_{CGES} = \frac{M_E \cdot R_{AS} + M_{P/L} \cdot R_{ETS}}{M_E + M_{P/L}}$$

Where:

$R_{CGES}$ is the distance from the center of the Earth to the center of gravity of the elevator system after payload addition (which equals the apogee radius of the elevator system)

The eccentricity of the perturbed orbit is given by:

$$\varepsilon = \frac{\frac{-V_{ES}^2 \cdot R_{CGES}}{\mu_e} + \sqrt{\left[\frac{-V_{ES}^2 \cdot R_{CGES}}{\mu_e}\right]^2 - 4 \cdot \frac{V_{ES}^2 \cdot R_{CGES}}{\mu_e} - 1}}{2}$$

Orbit parameters are continuously monitored and controlled to maintain the Space Elevator in a safe operating attitude at all times. Control is effected by the use of the re-booting system.

Restoration of the original orbit requires the addition of energy, in the form of thrusting forces along the direction of travel. It has long been known that applying force "up", or perpendicular to the direction of travel is an extremely inefficient method of adjusting orbits; greater efficiency is gained by application of thrust along or very near the direction of travel. Assuming we wish to restore a circular orbit from an inscribed ellipse, thrust is applied near the perigee, or low point, of the trajectory, parallel to the direction of travel. This method is not new, and has been used since the beginning of space navigation. By adding energy in this way the CM can be "re-boosted" to its' original orbit. In the case of the Space Elevator, this is much more efficient than standard boosting methods, as the electric propulsion is extremely efficient, consuming very little (if any) mass and adding energy to only the payload, not the additional mass of an upper stage spacecraft and boosting engines as with standard "upper stages". Standard methods of boost from equivalent conditions would consume more than ten times the payloads' mass in wasted mass, thus driving up the cost of moving the payload at least tenfold. Even with the re-boosting maneuvers, the Space Elevator orbits about the new, lower CM unless the payload is moved.

If a payload is released from the top of the elevator, a similar effect is caused. The outer end has high velocity, thus high momentum, so release of high momentum mass has the effect of reducing the overall system energy, just like adding a low momentum payload at the bottom. The restoration of original state requires re-boost as before.

The peculiar point about the Space Elevator is the reversal of this effect in payloads added at the top or dropped off the bottom. The field is conservative, thus all actions are reversible. So dropping mass off the bottom has the effect of re-boosting the Space Elevator without applying thrust. In this way, only the net mass traveling up the elevator must be accounted for in re-boost, further reducing the required energy for system re-boost. The orbital mechanics of tethers and of the Space Elevator are not new; many of the cited references describe this mechanism in detail and the principles of the motion have been demonstrated in actual flight experiments over the past twenty years (Table 1).

TABLE 1

Known Tether Flights

| Name | Date | Length |
|---|---|---|
| Gemini 11 | 1967 | 30 m |
| Gemini 12 | 1967 | 30 m |
| H-9M-69 | 1980 | 500 m |
| S-520-2 | 1981 | 500 m |
| Charge-1 | 1983 | 500 m |
| Charge-2 | 1984 | 500 m |
| ECHO-7 | 1988 | n/a |
| Oedipus-A | 1989 | 958 m |
| Charge 2-B | 1992 | 500 m |
| TSS-1 | 1992 | <1 km |
| SEDS-1 | 1993 | 20 km |
| PMG | 1993 | 500 m |
| SEDS-2 | 1994 | 20 km |
| Oedipus-C | 1995 | 1 km |
| TSS-1R | 1996 | 19.6 km |
| TiPS | 1996 | 4 km |

Germane to the understanding of the operations of the Space Elevator is insight into the effects of moving mass up and down the elevator cables. As noted previously, the Space Elevator is a rigid body moving in a conservative physical field. Using the principles of engineering statics, one can draw a "free body" diagram of the Space Elevator which indicates that the total energy of the system must remain the same when mass is moved up or down the cables. If the energy remains the same, the orbit cannot change. If the orbit does not change, what happens when mass is moved? The answer lies in the discussion of the center of mass. As noted before, all orbital objects track about their center of mass (CM). The Space Elevator experiences a shift in the location of its' CM when payload is added or subtracted to the ends. This CM shift is simultaneous, but separable in physical computation, from the change in the orbit path. The orbit path, as described above remains altered no matter where the payload is moved on the elevator. Only external forces such as thrust (or downward moving mass from outside the elevator) can restore the orbit. Moving the payload mass along the elevator cables has the effect of moving the CM relative to the fixed cables. It can be envisioned as sliding the CM up and down the cables near the Apex Station. If the payload moves to the Apex Station, the CM will be restored to its' original location. If the payload moves above the Apex Station, the CM shifts up the cables above the CM. This has no effect on the orbit of the station as a whole, but does affect the length of cable above and below the CM. Thus movement of payload along the cables affects the physical altitudes of the ends of the Space Elevator. This altitude change is directly proportional to the shift in the CM, which is relatively small, well within the expected safe boundaries of operations near the Earth's atmosphere. In practical operation, the effects of moving payload and applying thrust can be calculated and measured easily, and will be manipulated so as to allow for efficient operation of the system as a whole. It is interesting to note that from the standpoint of the flight vehicle coming up from the Earth to rendezvous with the Space Elevator, the actual altitude of the station end point is far less significant of a performance driver than the velocity that the end point is traveling.

Engineering of the System

The Space Elevator system according to the present invention offers many advantages over the use of conventional chemical rockets for payload transfers from earth or low-earth parking orbits to beyond-earth orbits, geosynchronous orbits, the international space station, or any other useful orbit in space. The principle advantage revolves around a significant reduction in transportation cost to space. Cost reduction arises from the inherent efficiency of the Space Elevator system, owing to the particular engineering arrangement of the overall system. Compared to standard rockets, the amount of mass consumed or thrown away during transfer is reduced more than tenfold over existing systems; this mass reduction enables ten or hundredfold reduction in cost of launch depending on destination. With the Space Elevator, the farther the destination, the larger the cost reduction realized over standard launch systems. Transportation cost reduction is a critical ingredient in the expansion of space activity; cost reduction can only occur with an increase in the overall efficiency of the transportation system.

The Space Elevator gains efficiency by reduction of expended and throwaway mass over existing launch systems owing to the advantages of the natural physics outlined in the sections above. The gains can be compared in two ways: comparison with the standard upper stages, and comparison with the overall launch efficiency. Due to the nature of the Space Elevator as an orbiting platform, the Space Elevator can use a more efficient propulsion system for re-boost than a traditional upper stage can use for boost. Relatively low thrust-to-weight Electric or Electro-dynamic propulsion is used to boost the elevator, whereas a standard rocket must use chemical propulsion or it will quickly de-orbit and burn up in the atmosphere. Electromagnetic propulsion schemes have proven highly efficient (Specific Impulse of 1,000 to 3,000 for Electric and 15,000 for Electrodynamic vs. 455 seconds for a chemical rocket) but are lower thrust per unit weight than chemical systems. As a result boosting with Electric or Electrodyamic propulsion takes more time to achieve the same energy input. The electromagnetic systems are also more expensive per pound of thrust and thus are not well suited for throwaway systems as current upper stages are operated. The gains in specific impulse (Isp) translate into exponential gains in mass fraction, and thus mass consumed as seen in the rocket equation (restated below)

$$\frac{M_{Propellant}}{M_{GLOW}} = 1 - \text{EXP}\left[\frac{-\Delta V}{g \cdot I_{SP}}\right]$$

Even though the Space Elevator is more efficient as upper stage, this is not the primary reason for using the Space Elevator. The Space Elevator is attractive because it reduces the velocity that the transfer vehicle from the ground to the lower end of the Space Elevator (Sub-Orbital Launch Vehicle or SOLV) must obtain. The reduction in total $\Delta V$ between the sub-orbital interface point and the low earth orbit is as high as 6,200 ft/sec; which reduces the energy required for the SOLV to move a given amount of payload by approximately half! (kinetic energy equals one half mass times velocity squared). This significantly reduces the size of the first stage and adds more non-fuel mass fraction to the vehicle as defined by the rocket equation. Reduction in mass fraction allows more efficient means of propulsion to be utilized on the SOLV; propulsion based on air-breathing systems while flying in the useful atmosphere which have Isp values above 3000 seconds as compared to standard rockets at 455 seconds. The elimination of $\Delta V$ from the end of the ascent profile dramatically improves the performance of an air-breathing ascent vehicle by reducing the time that the vehicle is operating in its most inefficient mode: the rocket only cycle of the ascent. This efficiency gain, coupled with the upper stage gains, makes the Space Elevator system highly efficient at delivering payloads to space.

An important improvement to the state of the art in the present invention relates to the method for constructing the physical structure of the Space Elevator, with specific emphasis on the cable assemblies. The design and construction of the Space Elevator is dominated by the gravity gradient effects described in the previous section. Cable tension forces near the Apex Station exceed 100,000 lbs. total load across the combination of cable assemblies. The arrangement and engineering of the cable assemblies has a dramatic effect on the Space Elevator overall mass and cost. Beyond the cable assemblies, construction of the three stations and carriages would utilize standard practices for space-based lightweight trusses, crew compartments, robotic arms, and other required components.

To understand the engineering of the cable assemblies, we must return to the discussion of gravity gradient. Recall, the acceleration due to gravity and the centripetal acceleration acting on the Space Elevator are balanced only at the center of mass of the Space Elevator system. For all altitudes other than the altitude of the center of mass of the system, local gravity is experienced and increases with increasing distance from the system center of mass. This gravity gradient pulls the Earth Transfer Station and Space Transfer Station away from the center of mass, thereby creating tension in the cables and stabilizing the entire system. The center of mass is designed to be located at or very near the Apex Station, depending on the status of payload movement operations. The loads can be computed from the local acceleration;

$$a = a_g - a_c = \frac{\mu_e}{r^2} - r \cdot \frac{\mu_e}{r_{cm}^3}$$

Where:
  a is the net acceleration of the orbiting system
  $a_g$ is the acceleration due to gravity $a_g = \mu_e/r^2$
  $a_c$ is the centripetal acceleration: $a_c = r(\mu_e/r_{rem}^3)$
  $r_{eg}$ is the distance from the Earth to the center of gravity of the orbiting system
  r is the distance from the center of the Earth to a given point on the satellite
multiplied by the local mass at a given height, yielding:

$$\frac{dF}{dr} = \rho \cdot A \cdot \frac{\mu_e}{r^2} - r \cdot \frac{\mu_e}{r_{cg}^3}$$

Where:
  p is the density of the material at the local station
  A is the cross-sectional area at the local station
  The cumulative effects of each element along the Space Elevator are summed (integrated) from the outer ends toward the center of mass. In this way the expected loads along the length of the elevator device can be computed, which in turn sizes the diameters (and masses) of the cables in each section. In practice, this process is not explicit, but iterative, as the mass of the cables is a large portion of the total system mass.

The dynamics of lifting tether systems cause the gravity experienced to be greatest at the endpoint stations; which requires careful consideration of the endpoint station design and functionality. The station structures designed to operate at the end point stations will contribute nontrivially to the overall cable load; minimizing functionality and mass is critical to reducing overall system mass. For the Space Elevator, operations at the endpoint stations are restricted to payload retrieval and release and are envisioned to be accomplished via remote robotics systems by crew located at the Apex Station or on the ground. In addition, any weight suspended from the endpoint stations must be supported through successive cable sections back to the midpoint station; design payload mass drives the cable sizing directly. For the case of a soft dock, the endpoint stations and supporting cables are sized to support the weight of the elevator carriage and payload only, thereby minimizing their weights.

The cables themselves are of nontrivial length and mass and contribute substantially to the load that must be supported. For the BEO Elevator, the cable mass approaches 80% of the overall Space Elevator system mass. Reducing the mass of the cables is critical to reducing mass and cost of the overall system. In the present invention, cable mass reduction is accomplished by the use of cable sections arranged along the length of the Space Elevator and connected by cable crossbeams. Each cable section (approximately 20 km apart) is sized to carry only the load required at that section, less load near the top and bottom of the Space Elevator and increasing to maximum at the Apex Station. At each crossbeam, load is distributed across the beam, thereby isolating each section and providing redundancy in the case of a cable failure. Unlike tether systems which propose ground to geostationary cables requiring materials not physically constructible, the Space Elevator in the present invention possesses an overall length short enough to allow construction of the system with current available materials.

In the present invention, a unique system of cable assembly is employed which utilizes two types of cables, lifting and load. The relatively small weight of the payload and the elevator carriage are supported by lifting cables in each section along the entire length of the Space Elevator. These cables (or ribbons) allow the friction wheels of the carriage to grip sufficiently and provide guidance to lift payloads from station to station. The loads on these cables are relatively low compared to the load of the entire cable assembly along the length of the Space Elevator. Load cables support the weight of the endpoint stations, and successive cable sections further away from the center of mass than any particular section under consideration. The load cables are formed from high strength to weight materials, envisioned to be carbon fiber bundles. The load is transferred from section to section by the cable connector crossbeams. This division of load between lifting cables and load cables allows a lower strength, less dense, material to be used to support the elevator and payload loads without paying an extreme weight penalty. At the same time, the high strength, low weight, material can still be used to support the majority of the system load. The arrangement of the cables as outlined in the present invention reduces the mass of the Space Elevator 3 to 4 times less than a simple constant diameter cable arrangement and provides an effective surface (lifting cables) to translate carriage loads to the main structure; a significant advance in the state of the art.

The arrangement of cable bundles within the overall structure has a strong effect on the utility of the overall system. Utilizing a single cable bundle for structural support as is common in the state of the art requires the payload to be supported centrally. In other words, the payload mass must be evenly distributed about a center hole. Since most payloads going to space are not amenable to such an arrangement, severe loss of utility would be incurred.

Figure 2:
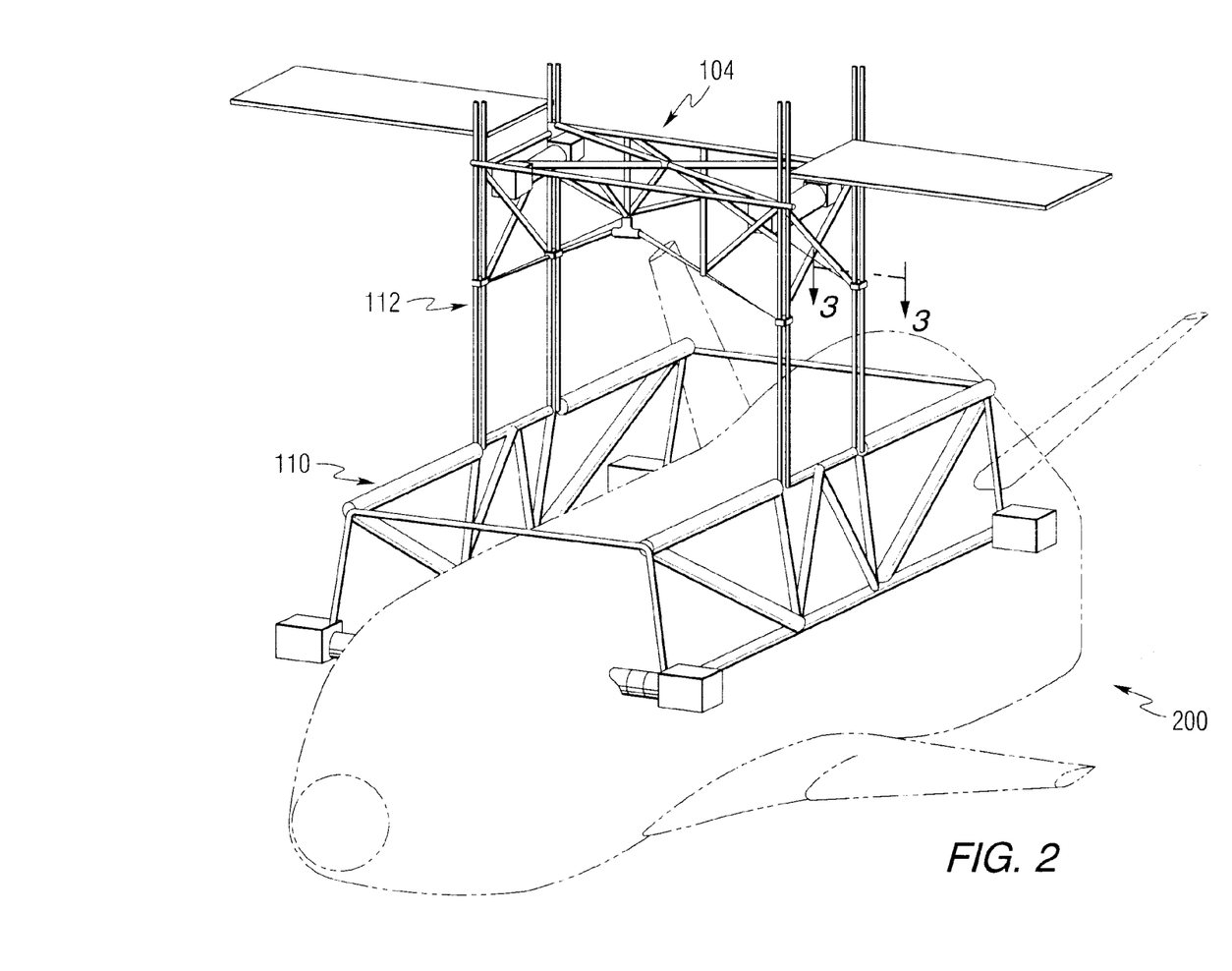
FIG. 2 illustrates the Earth Transfer Station of the present invention in rendezvous with a sub-orbital launch vehicle.
Figure 3:
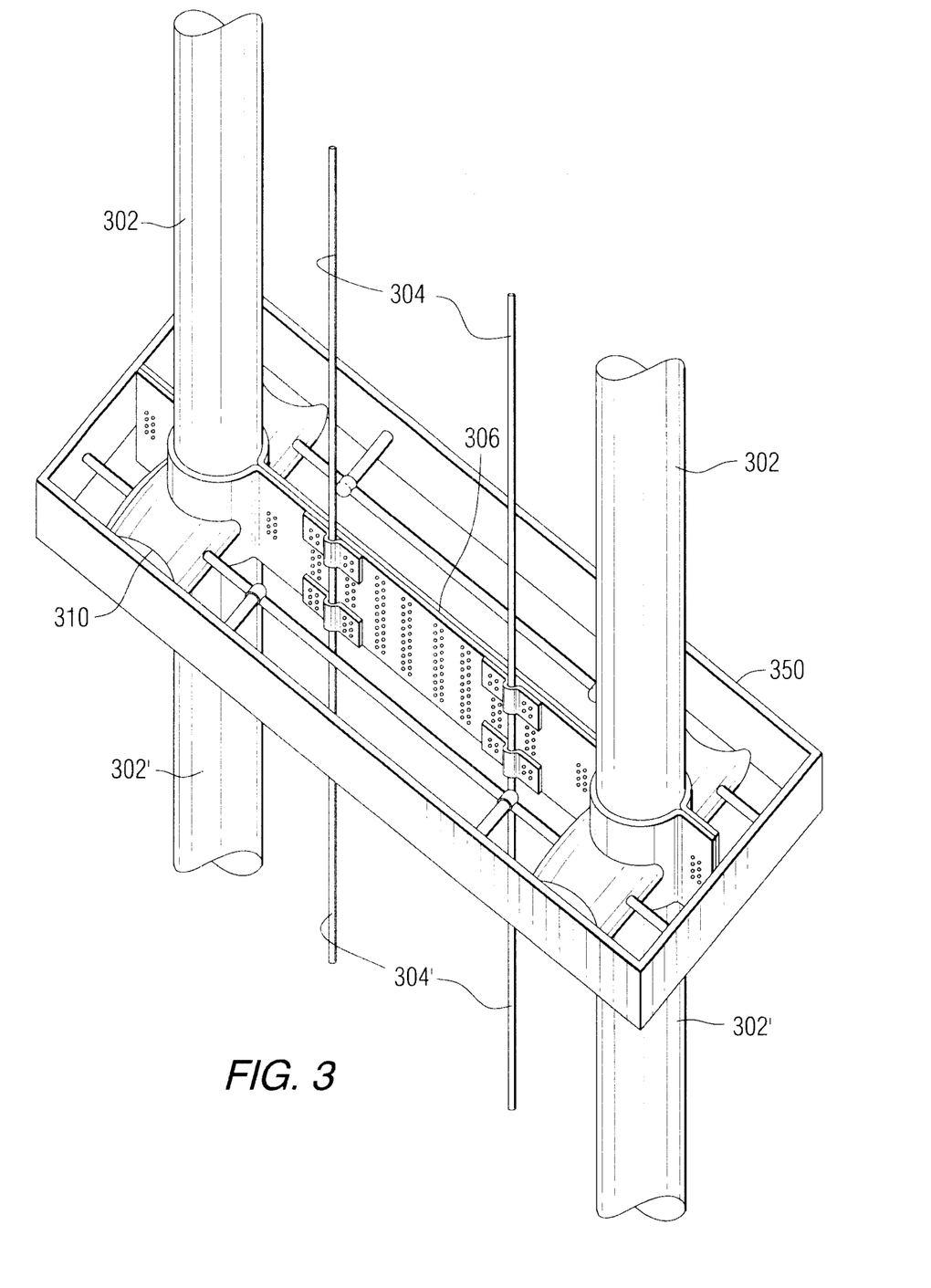
FIG. 3 illustrates one elevator cable leg used in the apparatus of the present invention.

Another method would be to use a static counterbalance hung opposite to the payload, which would centralize the center of gravity. This arrangement adds significantly to the mass of the carriage, and thus the overall mass of the Space Elevator system. To eliminate the requirement for a heavy counterbalance, the payloads on the Space Elevator will be supported by cables on the sides, as is shown in FIG. 2. This will require multiple (i.e., dual or quad) cable bundles. For redundancy and overall system performance reasons, the Space Elevator is envisioned to employ 4 sets of cable bundles, or "legs", as shown in FIG. 2. Looking closer at the cable legs, FIG. 3 shows the layout of the junction of two sections in a single cable leg. The cable leg 350 in FIG. 3 shows two lifting cables 302 and 302' and two load cables 304 and 304' for the cable section. Successive lifting and load cables are attached to the cable connector crossbeams 306 at predetermined locations as shown in FIG. 3. The load from the lower cables is transferred to the upper cables through the cable connector crossbeam. Elevator drive wheels 310 in the cable leg cause translation of the carriage relative to the lifting cables. The arrangement of load and lifting cables into individual "legs" about a standard payload canister allows significant increase in the overall utility of the system, allowing current payloads to be transferred on the Space Elevator without substantial modification.

The design of the individual cables contributes to the overall safety of the Space Elevator system. The individual load cables are envisioned to be composed of interwoven fibers. The fibers would be bound together at predetermined locations, preferably on the order of every 25 meters or so. This increases the micrometeorite impact tolerance of the cables. To cut a cable, all the fibers in a given cable would have to be severed. The number of load cables in a given cable leg is designed with ample margin so that, to cause a failure, more than half of the cables must be severed. The lifting cables are manufactured in the same way. Thus for a lifting cable to fail, all of the redundant fibers (more than half) of which the cable is comprised would have to be severed. To immobilize the elevator, both lifting cables common to a given leg track would have to be severed. The combination of these effects provides sufficient redundancy for long-term operation in a space environment populated by debris and particulates which could cause damage to the Space Elevator.

Design and implementation of the power generation and station control systems, most notably the re-boost system, must be carefully engineered to allow for margins of safety that would allow operation over many years. Given the long operating time expected, utilizing maximally renewable energy sources has dramatic effects on the operation of the Space Elevator. The largest consumer of energy is the re-boost system, which must make up for the momentum of the net mass moving up the Space Elevator. Other draining effects, such as station power, aerodynamic drag, solar wind drag, flatness perturbation, etc. must be quantified and included in the overall energy balance. Key to the successful implementation of the Space Elevator is the reduction of consumables in standard operations.

Space Elevator control systems must maintain orbital control during normal payload operations and have provision for emergency situations. The principle means of control is the application of thrust at the Apex Station along the vehicle direction of travel, known as re-boost. Re-boost adds energy to the Space Elevator to make up for the momentum deficit caused by payload added to the bottom of the elevator or released from the top. As noted before, any mass moving in reverse direction (such as refuse dropped from the bottom) will reduce the overall burden. The control system must be sized for the worst case, however, which would be a payload of maximum mass moving from bottom to top. The energy (ΔV) required for such an operation is roughly 18,000 ft/sec for the BEO elevator (energy expressed in payload mass terms). Each time a payload is moved, an equivalent amount of energy must be expended. The Space Elevator is envisioned to move one payload along its' full length per week at capacity, yielding a total expenditure of roughly 1,000,000 ft/sec in ΔV over the course of a year. A key advantage to the Space Elevator system is the ability to provide thrust over long periods of time (days instead of minutes) that substantially reduces the peak thrust requirement and allows more efficient means of propulsion. The most likely candidate for the Space Elevator primary re-boost would be an electrodynamic tether, which consumes almost no mass and uses relatively little power. Computations of the required thrust for the BEO elevator show that 50 lbs. of total thrust can re-boost the system from one payload transfer in roughly a week's time. With such a requirement, the power needed to supply the re-boost engines would require a solar array approximately the size of the solar array envisioned for the International Space Station. For emergency boost, a small set of cold-gas rockets would be stationed parallel to the primary system providing at least 10 times the thrust capacity of the primary, but for shorter duration. The Space Elevator primary control mechanism can be constructed to serve the needs of re-boosting the station under the worst case provided the loss mechanisms are not a substantial fraction of the total energy requirement.

Energy loss mechanisms for the Space Elevator are numerous, but their aggregate value remains a small fraction of the re-boost energy requirement. The largest loss mechanism is likely to be station power, which could consume as much as 40,000 ft/sec (referenced to the payload) on a yearly basis. Computation of atmospheric drag at altitudes above 150,000 ft. is difficult due to the rarity and variability of nitrogen, oxygen and other particles. Accurate computation of the drag of the Space Elevator is not possible, but a representative calculation can be demonstrated based on typically observed values. An estimate based on standard space practices yields an equivalent ΔV of only 3,200 ft/sec on a yearly basis as referenced to the payload. Solar wind drag and the earth flatness perturbation estimates yields values of approximately 1100 ft/sec and 900 ft/sec respectively. Thus the total estimated loss mechanisms, even with a 50% margin is 67,800 ft/sec, less than 7% of the re-boost total. In actual operations, the mass moving down the Space Elevator is expected to reduce the re-boost requirement by substantially more than 7%, thus the loss mechanisms do not drive the sizing of the overall system.

The engineering of the Space Elevator system has been conducted in such a manner as to render the system a substantial improvement in the state of the art. Physical laws and typical safety margins have been observed in all phases of the design of the system. For all systems considered up to and including the longest, the BEO elevator, the system is constructible from materials and processes available as of the date of this submission. The present invention represents a substantive improvement in the efficiency, and therefore cost, of moving payload to space.

Operation of the System

The deployment and operation of the Space Elevator will differ from typical space operations in many ways due to the nature of the gravity gradient forces. Effective management of the movement of payloads and employment of re-boosting engines can minimize both energy required and potential collisions. Key principles of the envisioned Space Elevator operations are detailed in this section.

Deployment of the Space Elevator will require a combination of conventional space launch means and on-board boosting systems. The method will be similar for any length Space Elevator, with the final altitude of the Apex Station being the only difference. Deployment begins by launching sections of the Apex Station on standard rockets to LEO, then assembling them in space. It is envisioned this may take two or three launches with 4 Space Shuttle flights for assembly support. Once on-line, the Apex Station serves as a backbone for all other hardware. Next, reels of cable representing two of the four legs of the final systems are launched on standard rockets and attached to the Apex Station. The last standard launch sequence brings up the Earth Transfer and Space Transfer Stations. Three Space Shuttle support mission complete the tasks of linking the stations to the ends of the cable reels, initial cable deployment to 500 meters, full system checkout and boost startup. Initial cable deployment is an important task as many tether missions have failed in the first 10 meters of reel-out due to the lack of a strong gravity gradient pull at that short distance. Once the cable has been reeled out to approximately 50 meters, the tension load from the gravity gradient will extend both the upper and lower cable sections to their initial boost length of 500 meters. Once initiated, the platform uses the electrodynamic re-boost engines to slowly lift the Apex Station to increasingly higher altitudes. As the Apex Station rises, cable is reeled out for both upper and lower sections for two legs of the system, pulled by the gravity gradient forces. At final length, special "crawler" elevator carriages are deployed to check the cable integrity and serve as lifting mechanisms (at half the final payload capacity) to bring the rest of the cable to the Apex Station. Once loaded, the remaining two legs are reeled out and the system is checked out for regular operations.

The primary task of the Space Elevator is movement of payloads along the length of the cable assemblies. As a secondary task at Apex Station, payloads can be stored and/or serviced and space operations can be conducted if required. Movement of payload mass along the length of the Space Elevator and re-boost thrusting are necessarily intertwined activities as one can benefit the other.

As described before, payloads entering and exiting "up" the Space Elevator require re-boost, while those moving "down" contribute re-boost. Efficient scheduling of these two activities dramatically improves the efficiency of the system by allowing these effects to balance each other within the operational constraints. Constraining the "up" direction, payload transfers from the SOLV will be restricted to a few opportunities a day due to the nature of orbital regression and release must be timed to match final orbital requirements of the payload. Constraints on the "down" direction are similar for payloads captured at Space Transfer Station and transferred to SOLV for return to earth. Waste material, however, has no timing constraint and provides an important freedom in mass control. Efficiency is gained by balancing "up" releases with "down" releases as much as possible, which minimizes re-boost.

Figure 5:
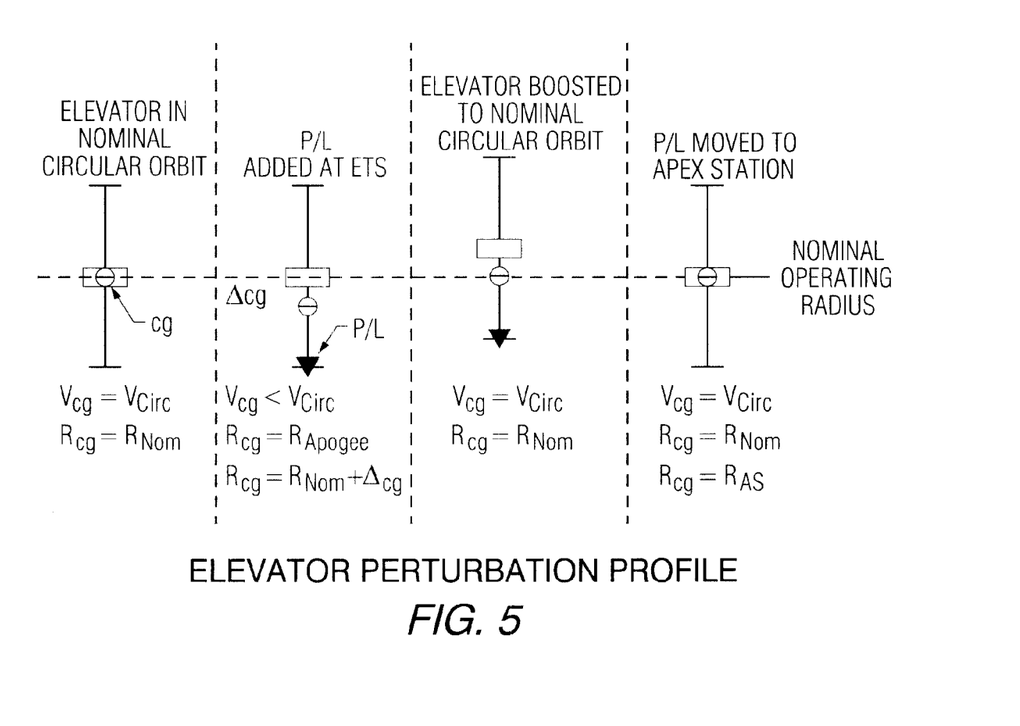
FIG. 5 illustrates the movement of the center of gravity of the Space Elevator in the present invention as payload moves along the cable assemblies.

Payload addition or removal also causes the center of mass (gravity) of the elevator system to move away from the starting point between the two end stations (FIG. 5). Boosting puts the center of mass of the elevator system back into a circular orbit but does not re-align the center of mass with the Apex Station. Moving the payload up the elevator causes the center of mass to move towards the Apex Station. Payload movement does not change the distance between the center of mass of the elevator system and the center of the Earth. The resulting effect, therefore, is a shift in the altitude of the Earth Transfer and Space Transfer stations as the payload moves. FIG. 5 depicts these changes visually. In practice, these shifts are small owing to the large mass of the elevator system relative to the moving payload. The presence of the gravity gradient means that any payload moving towards the center requires that energy be supplied to the carriage drive wheels. The amount of energy is relatively small, and can be contained in on-board battery storage devices, which are recharged from solar panels either on the carriage or through the main power bus at Apex Station. Payloads moving away from the center experience gravity that pulls them away from Apex Station, thus requiring braking (electro magnetically through the drive motors). Movement of payloads and the resulting shift in the center of mass must be linked to the orbit control system such that the re-boost applied will result in successful rendezvous with the SOLV.

The orbit control system maintains the Space Elevator in a safe orbital path throughout its' operation. Safety includes not only maintaining adequate altitude to keep from dragging into the earth's atmosphere, but also predicting and avoiding other satellites and orbital debris which may harm the system. The primary means for control is the application of re-boost thrust as described in the engineering section. Excepting the small loss mechanisms, the elevator is like any other orbiting system, therefore booster rockets are not needed except when mass is moved on or off the system anywhere except at the center of gravity. This translates into a conservation of angular momentum: mass added or subtracted at any velocity/altitude combination except the center of gravity changes the total system angular momentum which must be corrected by thrusting. When payloads deplete angular momentum (added to the bottom or dropped off the top), forward thrust is employed along the flight path at the elevator center of mass. When angular momentum is subtracted from the system (payloads added to the top or dropped off the bottom), one would either require thrust opposite the flight path (deceleration), or more appropriately, scheduling the mass moving "up" the system to counteract this effect. Since it is likely that more mass will be moving up the elevator than down the elevator, it is expected that the primary thrusting or re-boosting, will occur along the flight path. Scheduling re-boost can allow the orbit control system to actively avoid collisions with objects that may harm the system. Objects in crossing orbits with the Space Elevator must be avoided. This is accomplished by adjusting the phase of the Space Elevator orbit so the potential collision object is not at the same place at the same time as the Space Elevator. Application of re-boost thrust has the effect of changing not only the orbital energy of the Space Elevator, but also its' phase. Thus, active monitoring of satellites and debris on potential collision paths allows the orbit control system to "navigate" through the potential collisions while re-boosting. The orbit control system has been simulated by the authors and proves to be straightforward and achievable even with the density of objects currently in space. Coupling the re-boost of the system with the mass movement along the cables has a positive effect on the efficiency of the entire Space Elevator system.

The Apex Station platform also serves as a rigid zero-gravity frame from which activities can be conducted in space; payloads can be stored and processed, experiments conducted, materials manufactured, and repairs conducted. The amount of mass stored at Apex Station has little effect on the overall operations of the Space Elevator. Adding or subtracting mass at the center of mass only changes the eccentricity of the resulting orbit slightly. Actually, more mass at Apex Station reduces eccentricity, thus increasing mass makes the system operate better. The long list of activities which could be conducted at Apex Station are not detailed here, but include at a minimum any activities that are conducted on existing space stations. For the Space Elevator, the Apex Station represents an important station to conduct on-orbit servicing.

An important tenet of the Space Elevator is the plan for continuous on-orbit servicing. As with any structure, the Space Elevator will wear with time and exposure to the space environment and portions will have to be repaired or replaced. The most critical and highly stressed components are the load and lifting cables. Should a lifting or load cable fail or weaken, it can be disconnected at its upper and lower cable connector crossbeam and replaced. Additional cables may be added at any time as they arrive from earth to strengthen the overall structure. Cable servicing is envisioned to be accomplished by remote robotics, controlled either from the ground or from the Apex Station. In any case, the redundancy built into the system ensures safety against catastrophic failure even with multiple cable failures.

The operation of the Space Elevator, coupled with its' inherent design and construction, enables continuous movement of payloads from earth to space and from one location in space to another for extended periods of time. By increasing the efficiency of this movement, the Space Elevator dramatically reduces the cost of transporting payloads to space, tenfold to LOE and MEO, hundred or thousand-fold for GEO and BEO. The present invention, drawing upon the natural physics available, represents a new and unique capability in the field of transportation.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

We claim:

1. A space elevator for transporting a payload from one point to another in outer space, comprising:

a first structural means, located at a first substantially fixed orbital distance from the surface of the earth, for receiving payloads, a second structural means, located at a second substantially fixed orbital distance from the surface of the earth, for receiving payloads, said second distance being greater than said fist distance, no portion of said elevator is attached to the earth's surface, and payload-transporting means disposed between and interconnecting said first and said second structural means, said payload-transporting means includes cable means extending between said first and said second structural means, said cable means comprising lifting cables and load cables, wherein said lifting cables comprise a lower strength, less dense, material than said load cables, and a housing supported by said cable means for traveling along said cable means, said housing being capable of moving said payload between said first and said second structural means, said housing further includes a drive motor for propelling said housing along said lifting cables.

2. The space elevator of claim 1, wherein said lifting cables comprise interwoven bundles of fibers, said fibers being bound together at spaced locations.

3. The space elevator of claim 2, further comprising cable connector cross-beams connected between said load cables and said lifting cables.

4. The space elevator of claim 3, wherein successive sections of said lifting and load cables are attached to said cable connector cross-beams.

5. The space elevator of claim 2, said spaced locations being approximately every 25 meters.

6. The space elevator of claim 1, and further including an apex station disposed between said first and said second structural means and positioned at a center of gravity of the space elevator.

7. The space elevator of claim 6, further including engine means positioned at the apex station for maintaining said first and said second structural means substantially fixed within an orbit at said first and second distances from the surface of the earth.

8. The space elevator of claim 1, wherein said first and second structural means each comprise docking means for space craft, and means for transferring payloads between said space craft and the respective structural means at which it is docked.

9. The space elevator of claim 1, further comprising:
   means for friction coupling the drive motor to the lifting cables.

10. The space elevator of claim 9, wherein the means for friction coupling the drive motor to the lifting cables comprises:
   wheels in contact with a surface of at least one of the lifting cables.

* * * * *

UNITED STATES PATENT AND TRADEMARK OFFICE
CERTIFICATE OF CORRECTION

PATENT NO. : 6,491,258 B1
DATED : December 10, 2002
INVENTOR(S) : Robert R. Boyd and Dimitri D. Thomas It is certified that error appears in the above-identified patent and that said Letters Patent is hereby corrected as shown below:

Column 6,
Line 24, "$a_c = r(\mu_e/r_{em}^{3})$" should read -- $a_c = r(\mu_e/r_{em}^3)$ --.

Column 9,
Line 16, "$\ldots \left[ \dfrac{-V_{ES}^2 \cdot R_{CGES}}{\mu_r} \right]^2 \ldots$" should read -- $\ldots \left[ \dfrac{V_{ES}^2 \cdot R_{CGES}}{\mu_r} \right]^2 \ldots$ --.

Column 12,
Line 52, "p" should read -- ρ --.

Column 18,
Line 53, "fist" should read -- first --.

Signed and Sealed this

Twelfth Day of October, 2004

JON W. DUDAS
*Director of the United States Patent and Trademark Office*